(12) United States Patent
Bardon et al.

(10) Patent No.: US 6,181,349 B1
(45) Date of Patent: Jan. 30, 2001

(54) DATA PROCESSOR CONTROLLED DISPLAY INTERFACE WITH COMPOSITE GRAPHIC OBJECTS FORMED BY VECTOR AND RASTER GRAPHICS

(75) Inventors: Didier Daniel Claude Bardon; Scott Anthony Morgan; John Martin Mullaly; Craig Ardner Swearingen, all of Austin, TX (US)

(73) Assignee: International Business Machines Corporation, Armonk, NY (US)

(*) Notice: Under 35 U.S.C. 154(b), the term of this patent shall be extended for 0 days.

(21) Appl. No.: 08/897,485

(22) Filed: Jul. 21, 1997

(51) Int. Cl.[7] .......................... G06T 11/00; G06T 11/80; G09G 5/36
(52) U.S. Cl. .................... 345/433; 345/435; 345/133; 345/135
(58) Field of Search .................... 345/432, 136, 345/133, 433, 441, 426, 144, 442; 382/173

(56) References Cited

U.S. PATENT DOCUMENTS

| | | | |
|---|---|---|---|
| 5,293,579 | * 3/1994 | Stockholm | 382/269 |
| 5,428,546 | 6/1995 | Shah et al. | 364/449 |
| 5,467,441 | 11/1995 | Stone et al. | 395/133 |
| 5,479,603 | 12/1995 | Stone et al. | 395/161 |
| 5,499,325 | * 3/1996 | Dugan, Jr. | 345/432 |
| 5,515,081 | 5/1996 | Vasilik et al. | 345/189 |
| 5,524,200 | 6/1996 | Orton et al. | 395/157 |

OTHER PUBLICATIONS

Microsoft Press Computer Dictionary Third Edition, Microsoft Press, 1997.*
Foley et al., "Computer Graphics: Principles and Practice" Second Edition, Addison–Wesley Publishing Company, pp. 9–14, 1990.*

* cited by examiner

Primary Examiner—Mark R. Powell
Assistant Examiner—Chante' Harrison
(74) Attorney, Agent, or Firm—J. B. Kraft; Volel Emile

(57) ABSTRACT

A data processor controlled display system is provided having on-screen graphic control objects which are a composite of portions formed by vector graphics and portions formed by raster graphics. The peripheral regions of the individual objects are formed by vector graphics and preferably have curvilinear portions while the non-peripheral portions of objects formed by raster graphics have higher visual resolutions.

15 Claims, 5 Drawing Sheets

DATA PROCESSOR CONTROLLED DISPLAY INTERFACE WITH COMPOSITE GRAPHIC OBJECTS FORMED BY VECTOR AND RASTER GRAPHICS

TECHNICAL FIELD

The present invention relates to user interactive computer supported display technology and particularly to such user interactive systems and methods which are user friendly, i.e. provide even non-computer-literate users with an interface environment which is easy to use and intuitive. More particularly, the present invention relates to display interfaces providing realistic and aesthetically desirable on-screen controls through which the user may interact with the display for the control of electronic media presentations.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported marketplaces to continue and to be commercially productive, it will be necessary for a large segment of computer indifferent consumers to be involved in computer interfaces. One approach which has been advanced involves creating interfaces to computers which are as close to the real world as possible.

One major market for user friendly computer controlled display interfaces has been in the selection and delivery of a variety of electronic media presentations in the multimedia marketplace. In the media presentation product fields, it is very important to provide viewers or users with on-screen controls which resemble real world controls as closely as possible. In order to make such realistic on-screen controls, it has been conventional to use raster graphics which provides high resolution images used to form the display objects representing the controls. With raster graphics, the display objects may be made to look like three-dimensional real life objects with all of the attendant nuances of light and color. However, because raster images are formed on matrices which are inherently rectilinear, it is difficult to form images with smooth curved lines and planes using raster graphics. Thus, there is a shortcoming in using raster graphics to form display objects since in real world objects curved lines and surfaces are more prevalent than straight lines.

The present invention provides graphic objects which combine the high resolution advantages of raster graphics objects with the inherent ability of vector graphics to provide images with smooth curved lines and surfaces.

SUMMARY OF THE INVENTION

The present invention provides a data processor controlled display system having graphic objects formed by a combination of vector graphics and raster graphic means. Those portions of the objects requiring high resolution rendering in order to bring out aesthetic aspects may be formed by raster graphics while those object portions with curvilinear lines and surfaces may be formed by vector graphics.

In the provision of on-screen control objects, best results may be achieved by forming the outer or peripheral regions of the object which are often curvilinear by vector graphics while forming the inner regions which may require finer detail by raster graphics. Through appropriate color matching techniques, the regions may be integrated with each other so as to become individually indistinguishable. The invention is particularly effective in the formation of contoured on-screen control buttons.

DETAILED DESCRIPTION OF THE PREFERRED EMBODIMENT

Figure 1:
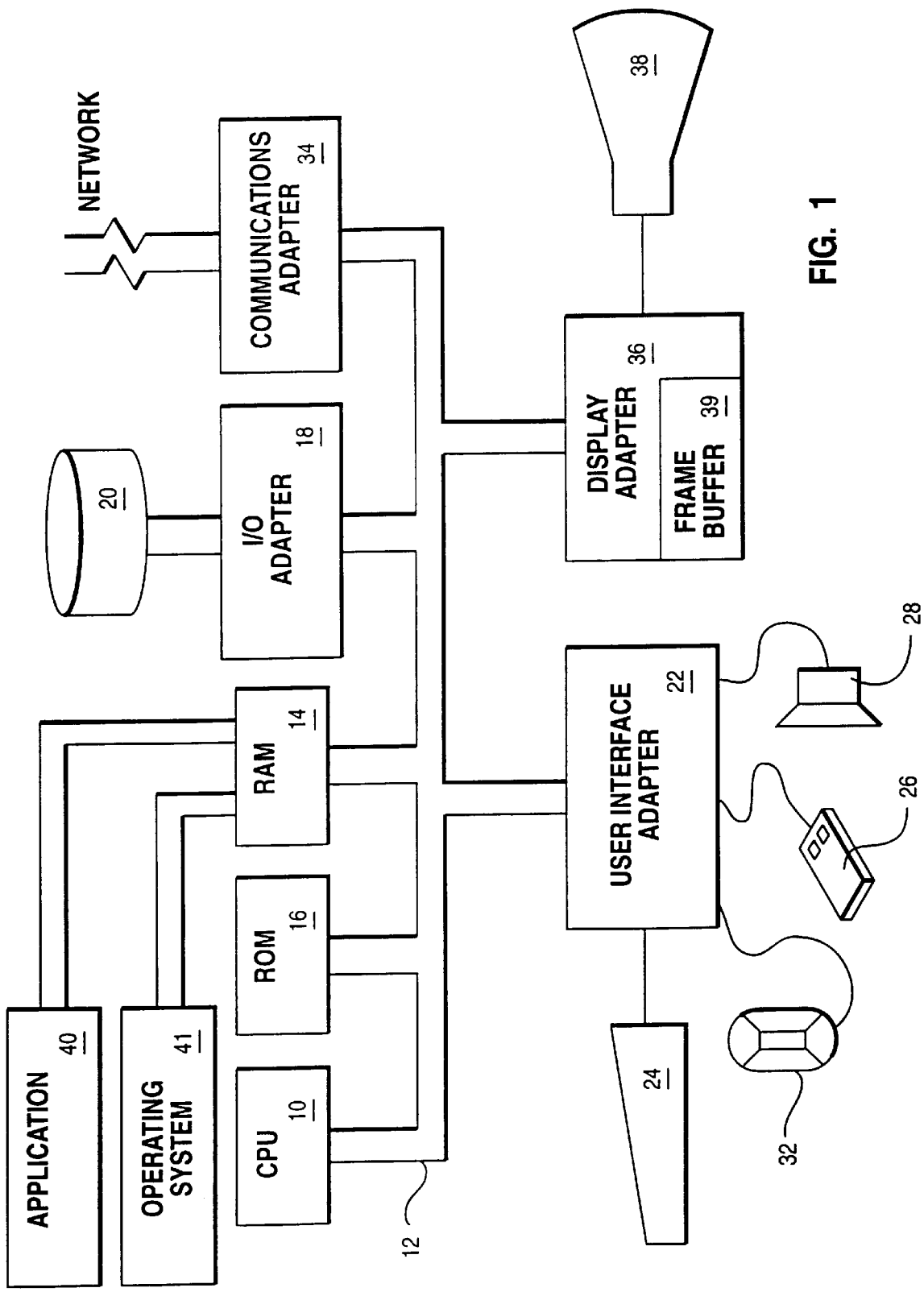
FIG. 1 is a block diagram of a data processing system including a central processing unit which is capable of implementing the present invention.

The preferred embodiment which will be described may be used within a three-dimensional display environment. However, it should be understood that the present invention is even more likely to be displayed and practiced within a more conventional two-dimensional windows-like environment because such windows environment are so pervasive in existing user interfaces. In fact as will be hereinafter described, the contoured 3D like graphic objects of the invention are constructed within a windows user interface.

Copending application, "Interactive Display Interface For Media Presentation", D. Bardon et al., filed May 23, 1997 and assigned to the assignee of the present invention covers a computer controlled three dimensional display interface for controlling electronic media presentations. Another copending application, "Interactive Display Interface For Media Presentation Having Simplified Controls", Shirley Martin et al., also assigned to the assignee of the present invention covers particular control switches and control interfaces which may used in the control of such presentations. The present invention provides a system and method for rendering such controls in aesthetically desirable display images. Because of the close relationship of the present on-screen control embodiment with those of the above two copending applications, it will be described within their 3D environment.

Before going into the details of the specific embodiments, it should be helpful to understand from a more general perspective the three-dimensional workspace with respect to which the present invention is described. The three-dimensional workspace is a workspace that is perceived as extending in three orthogonal directions. Typically a display has a two-dimensional display surface and the perception of a third dimension is effected by visual clues such as perspective lines extending toward a vanishing point.

While the three-dimensional embodiments used to illustrate the present invention can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques used in creating the three-dimensional background environment as well as the objects of the present invention involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Referring to FIG. 1, a typical data processing system is shown which may be used in conjunction with object oriented software in implementing the environment of the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. As will be hereinafter described in greater detail, the input means through which the present invention is implemented may be the trackball, mouse or keyboard, each of which has a key or equivalent member which may pressed or held down. Where the I/O is through a touch screen, then the image area on the touch screen representing the on-screen graphic control objects of the present invention may be directly pressed.

Figure 2:
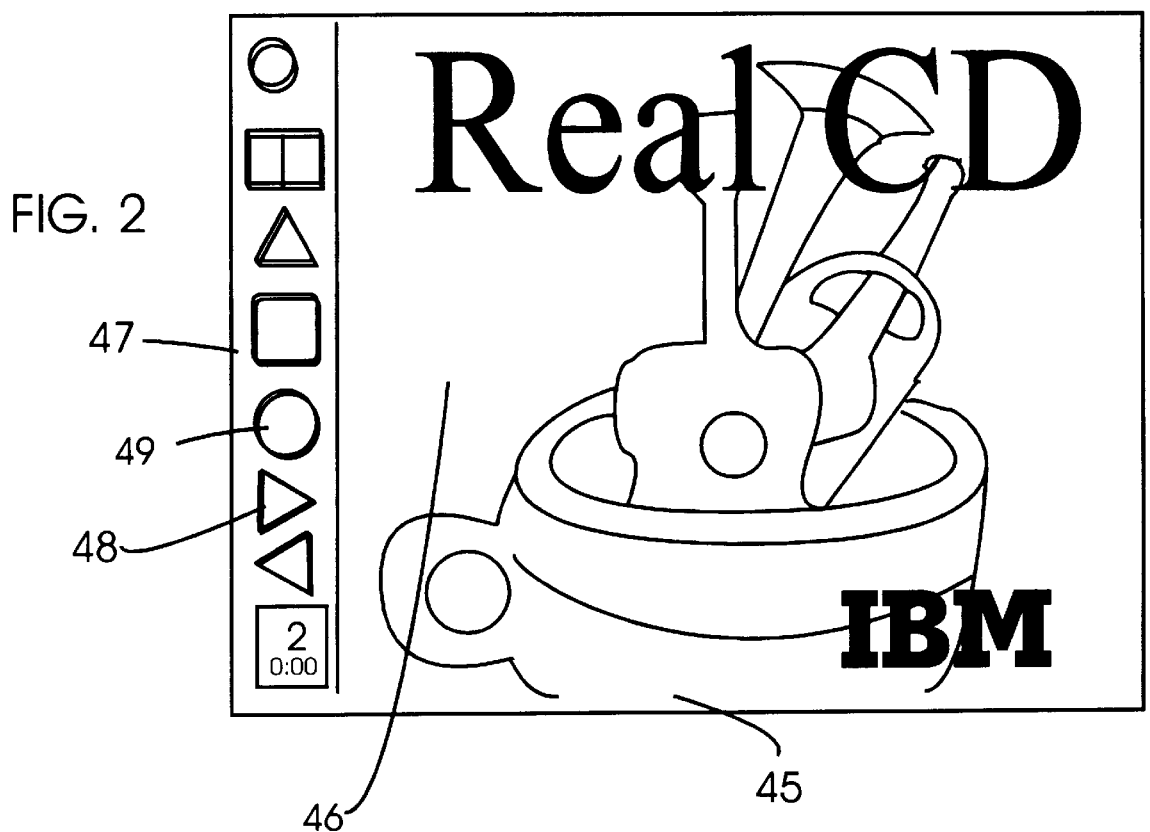
FIG. 2 is a representation of an illustrative displayed audio CD presentation with an on-screen composite control button provided by the present invention.
Figure 4A:
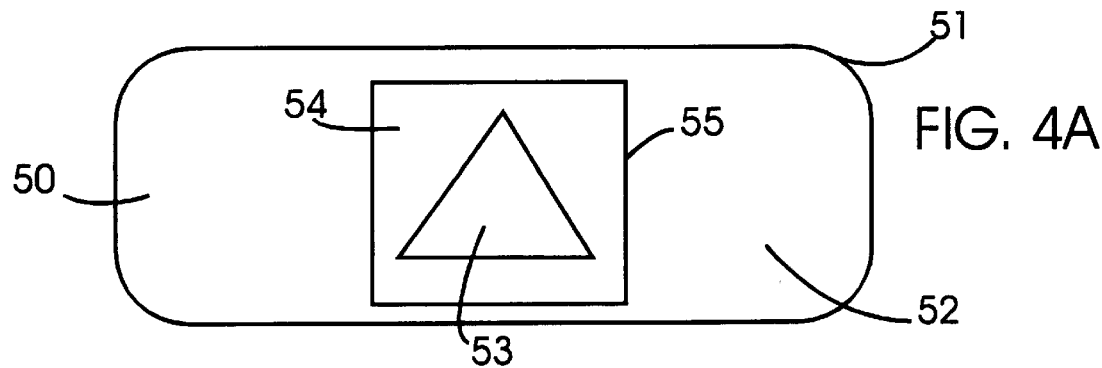
FIGS. 4A through 4D are diagrammatic illustrations of the series of steps used in forming a control button like that of FIG. 3.
Figure 4B:
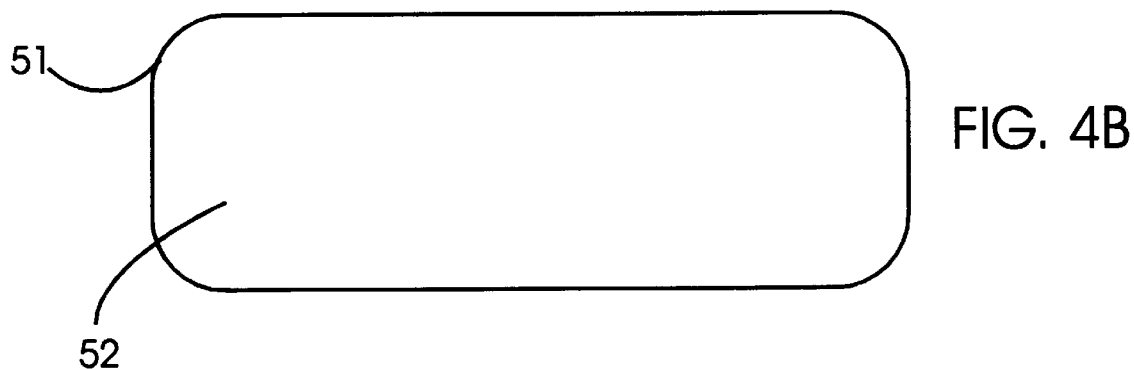

The present invention will now be explained in detail using for an initial example, an audio CD presentation system such as that described in the above mentioned application, "Interactive Display Interface for Media Presentation." Bardon et. al., or more particularly in its related above described Martin et. al. With reference to FIG. 2 in the present specification, control image 45 is the same control image used in FIG. 4A of the Martin et. al. application. The CD control image 45, contains a realistic image of the CD jacket 46 as well as all of the controls 47 necessary to run the CD audio presentation. The individual control buttons such as buttons 48 and 49 have an aesthetically pleasing contoured 3D appearance with shadowing. Several of the buttons such as control button 49 have curved outlines and surfaces.

We will now describe how such curvilinear buttons may be formed in accordance with the present invention. Control button 50 in FIG. 3 which will serve as the illustrative example of this invention is very similar to control button 49 except that the former has a circular periphery while button 50 has a combined curvilinear and rectilinear periphery. Control button 50 is divided into several sections. Periphery 51 will be defined by vector graphics as will colored regions 52 bordering or adjacent to periphery 51. The triangle portion 53 of the button which is shaded and contoured will be defined by raster graphics as will regions 54 adjacent to triangle portion 53. It should be understood that when we describe vector graphics and raster graphics techniques for forming the various regions, we intend that any conventional vector or raster graphics methods may be used. These graphics techniques have been well defined in graphics display technologies.

Reference may be made to the text, *Computer Graphics, Principles and Practice,* 2nd, Edition, Foley and van Dam, 1990, published by Addison-Wesley Publishing Company for thorough descriptions of conventional vector and raster graphics techniques which may be used to implement this invention. A typical vector graphics generating program contains point and line plotting commands with (x,y) or (x,y,z) endpoint coordinates, as graphics plotting commands. These commands for plotting points or lines are interpreted the processor controlling the display. It sends digital and point coordinates to a vector generator forming the graphic images on the display. Raster graphics store their display primitives such as lines and solidly shaded or patterned areas in a refresh buffer in terms of their component pixels. The image on a raster display is formed from the raster which is a set of horizontal raster lines, each a row of individual pixels; the raster is thus stored as a matrix of pixels representing the screen area where the raster image is formed.

Figure 3:
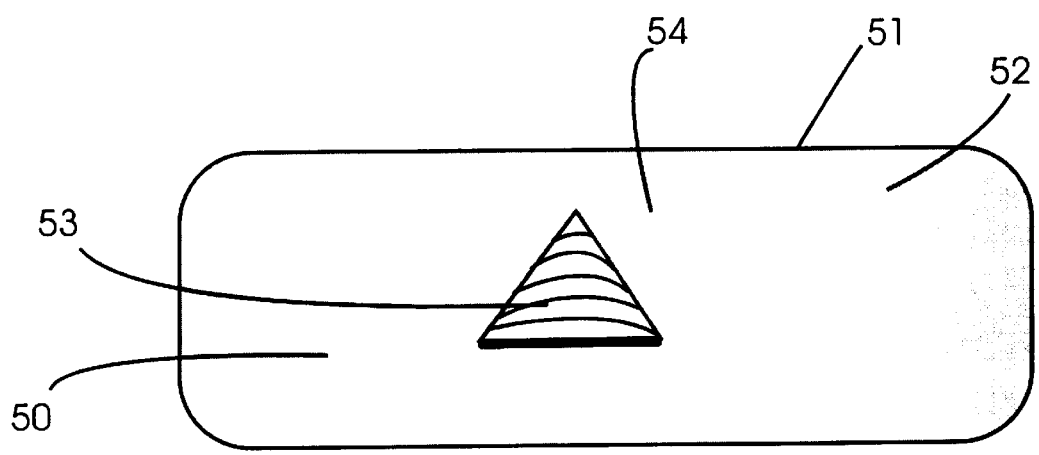
FIG. 3 is an example of an on-screen display composite control button formed in accordance with the present invention.
Figure 4C:
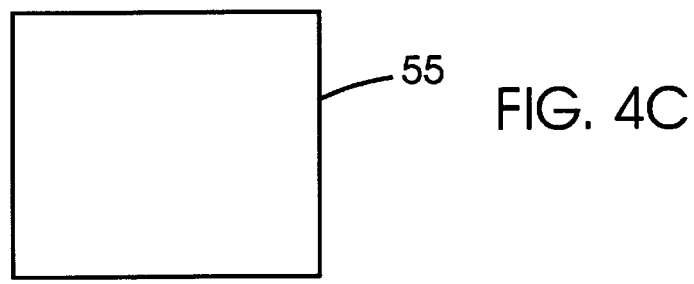
Figure 4D:
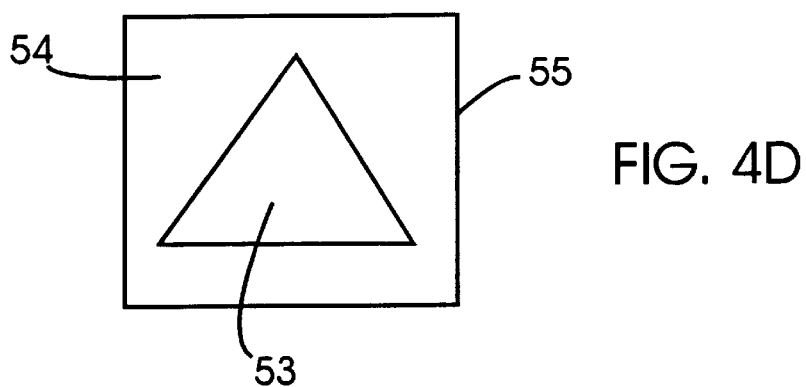

The control button 50 of FIG. 3 is a composite image formed of vector and raster portions. With reference to FIGS. 4A to D, the formation of this illustrative object will be described, In FIG. 4A, the outlines of the regions formed by vector and raster scanning are respectively shown; everything within window 55 is formed by raster graphics techniques, and everything outside of that window is formed by vector graphics. First, FIG. 4B, the outline or periphery of control button 50 is formed using conventional vector graphics techniques as described in the above referenced Foley and van Dam text. Outline 51 is defined in terms of x,y coordinates with respect to a selected origin. Then, using conventional vector graphics filling techniques, a fill value is assigned to region 52 as is a selected color value. Next, FIG. 4C, a window 55 is generated and its initial coordinates are defined so that it will be positioned within region 52 at the position shown in FIG. 4A. The contents within window 55 shown in outline in FIG. 4D are generated by conventional raster graphics techniques also described in the referenced Foley and van Dam text. Triangle 53 may be shaded and contoured to achieve the visual effects shown in FIG. 3 by the raster graphics techniques. Also region 54, FIGS. 4A and D will be assigned a RGB color value which is coordinated with the RGB color value assigned to the vector fill RGB color value assigned to region 52 so that regions 52 and 54 will appear to be continuous and the outline of window 55 will not be visible as in FIG. 3.

Figure 5A:
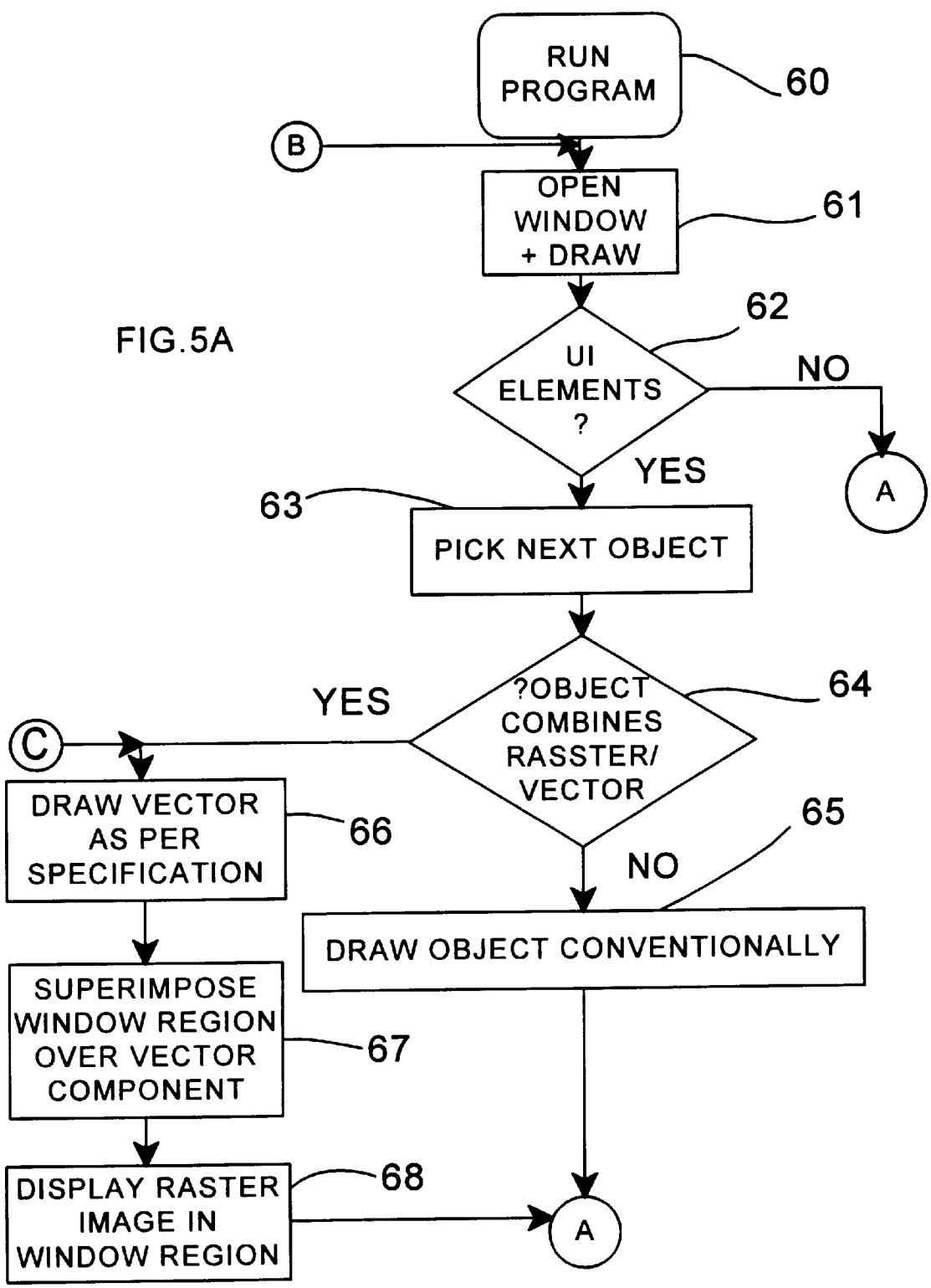
FIG. 5 is a flowchart of an embodiment of a process implemented by the present invention for forming and displaying a composite on-screen control switch in accordance with the present invention.
Figure 5B:
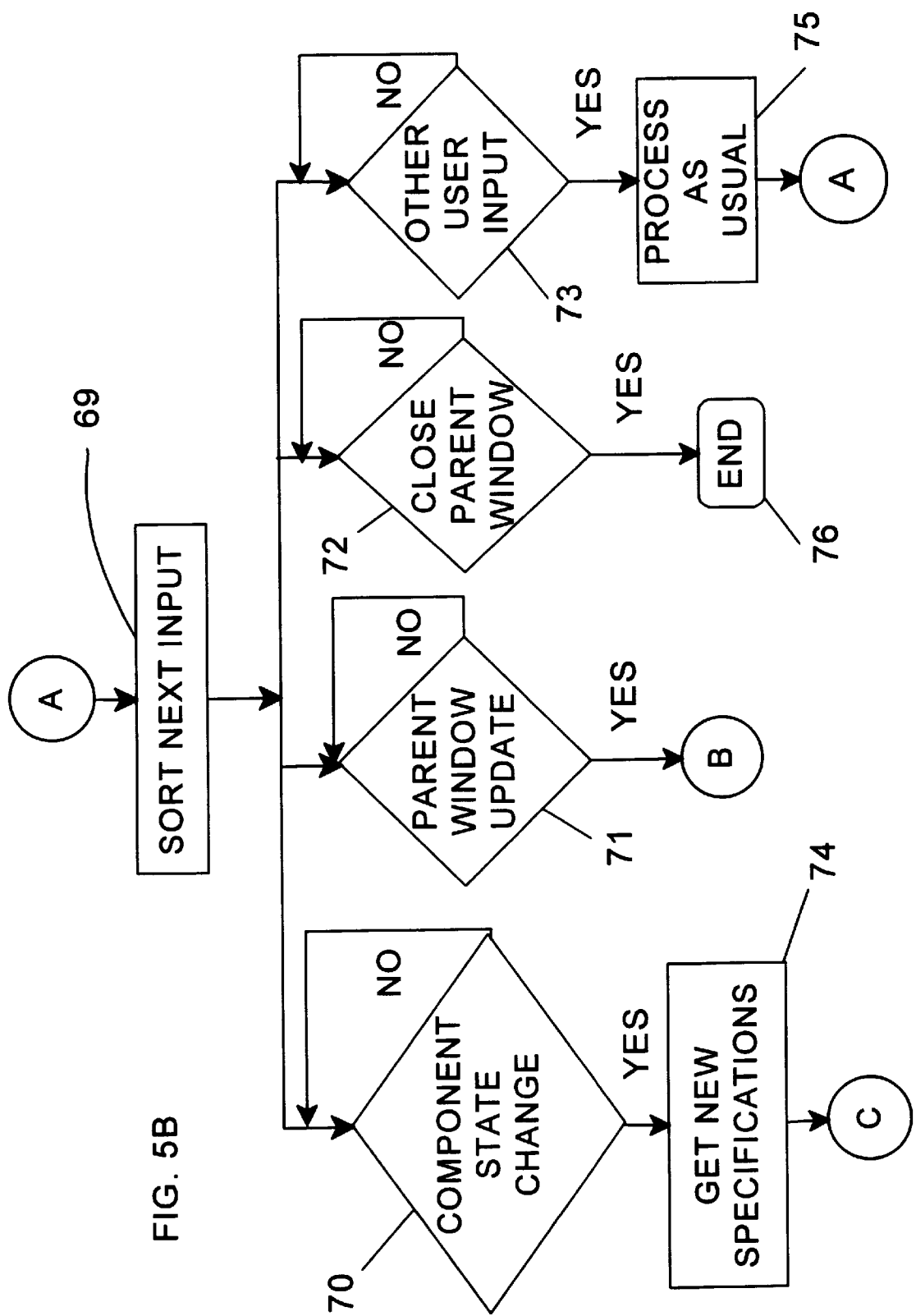

Now with reference to FIG. 5, we will describe a process implemented by the present invention in conjunction with the flowchart of this figure. The flowchart shows an illustrative program during which graphics are to be drawn or displayed. Most of the graphics are formed by conventional raster graphics techniques in this example but at appropriate selected points in the sequence, the composite graphic objects in accordance with the present invention are generated. The graphics draw program is commenced, step 60. On the display screen, an appropriate window within which the graphics are to be formed is opened, step 61. Next, decision step 62, a determination is made as to whether there are any user interface (UI) objects to be drawn. In this case there are objects to be drawn so the flow moves to step 63 where the next object to be drawn is picked. Then, step 64, a determination is made as to whether the picked object combines raster and vector graphics in accordance with this invention. If No, then the object is drawn conventionally by raster graphics, step 65. It the decision from step 64 is Yes, then the flow goes to step 66 and the vector portion is drawn e.g., the step in FIG. 4B. Next, step 67, the raster window of FIG. 4C is superimposed on region 52 in the position shown in FIG. 4A, and, step 68, the raster image is formed as previously described, i.e., triangle 53 and background 54 to complete the illustrative control button of FIGS. 3 and 4A.

Now the flow moves to step 69 which is the same point the system would be at after a conventionally drawn object, step 65. In step 69, the next input is sorted through a set of parallel paths via one of decision steps 70, 71, 72 and 73. If the path is Yes through step 71, i.e., a parent window change, then the flow loops back to step 61 via entry point "B" and a new parent window is drawn. If the path is Yes through step 72, i.e., to close the parent window, then the session is ended, step 76. If the path is Yes through step 73, i.e., another type of user input other than the present graphics, then, step 75, it is processed in any standard way and the flow is returned to sort step 69 via entry point "A". If the path is through decision box 70, i.e., another object with vector and raster draw elements, then, the new specification is obtained, step 74, and the flow returns to vector draw step 66. Also, if in decision step 62, it is determined that there are no (UI) objects to be drawn, then the flow also goes to sort step 69 via entry point "A".

Although certain preferred embodiments have been shown and described, it will be understood that many changes and modifications may be made therein without departing from the scope and intent of the appended claims.

What is claimed is:

1. In a data processor controlled display system, means for displaying composite graphic objects comprising:

vector graphic means for rendering a first portion of a displayed graphic object, and raster graphic means for rendering a second portion of said displayed graphic object visibly indistinguishable from said first portion.

2. The data processor controlled display system of claim 1, wherein said first portion comprises the peripheral regions of said graphic object, and said second portion comprises non-peripheral regions of said graphic object.

3. The data processor controlled display system of claim 2, wherein the periphery of said graphic object has curvilinear portions.

4. The data processor controlled display system of claim 3, wherein said second portion is rectilinear.

5. In a computer implemented method for displaying graphic objects, a method for rendering composite graphic objects comprising:

rendering a first portion of a displayed graphic object by vector graphics, and rendering a second portion of said displayed graphic object by raster graphics visibly indistinguishable from said first portion.

6. The method of claim 5, wherein said first portion comprises the peripheral regions of said graphic object, and said second portion comprises non-peripheral regions of said graphic object.

7. The method of claim 6, wherein the periphery of said graphic object has curvilinear portions.

8. The method of claim 7, wherein said second portion is rectilinear.

9. A computer program having data structures included on a computer readable medium which causes a display on a data processor supported display of a composite graphic object comprising:

vector graphic means for rendering a first portion of a displayed graphic object, and raster graphic means for rendering a second portion of said displayed graphic object visibly indistinguishable from said first portion.

10. The computer program according to claim 9, wherein said first portion comprises the peripheral regions of said graphic object, and said second portion comprises non-peripheral regions of said graphic object.

11. The computer program according to claim 10, wherein the periphery of said graphic object has curvilinear portions.

12. The computer program according to claim 11, wherein said second portion is rectilinear.

13. In a data processor controlled display system, means for displaying composite on-screen control buttons for controlling a displayed presentation comprising:

vector graphic means for rendering a curvilinear peripheral first portion of a displayed control button, and raster graphic means for rendering a rectilinear non-peripheral second portion of said displayed control button having a higher visual resolution than said first portion.

14. In a computer implemented method for displaying graphic objects, a method for rendering composite on-screen control buttons for controlling a displayed presentation comprising:

rendering a curvilinear peripheral first portion of a displayed control button by vector graphics, and rendering a rectilinear non-peripheral second portion of said displayed control button by raster graphics, said second portion having a higher visual resolution than said first portion.

15. A computer program having data structures included on a computer readable medium which causes a display on a data processor supported display of a composite on-screen control buttons for controlling a displayed presentation comprising:

vector graphic means for rendering a curvilinear peripheral first portion of a displayed control button, and raster graphic means for rendering a rectilinear non-peripheral second portion of said displayed control button having a higher visual resolution than said first portion.

\* \* \* \* \*